(12) United States Patent
Carlstedt et al.

(10) Patent No.: US 6,641,121 B1
(45) Date of Patent: Nov. 4, 2003

(54) DAMPING STRUCTURE

(75) Inventors: Robert P. Carlstedt, Rochester Hills, MI (US); Daniel Eugene Whitney, Arlington, MA (US); Mark C. Smith, Troy, MI (US); Eric Stephen Geib, Fenton, MI (US); Steven M. Foster, Rochester, MI (US); Richard M. Clisch, Canton, MI (US); Shan Shih, Troy, MI (US); Juan Jose Marcos Munoz, Pamplona (ES)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/038,161

(22) Filed: Jan. 3, 2002

(51) Int. Cl.⁷ .............................................. B60G 13/00
(52) U.S. Cl. ...................................................... 267/219
(58) Field of Search .......................... 267/35, 257, 258, 267/153, 140.13, 140.14, 140.15, 140.3; 36/35, 27, 28; 188/266.7, 269, 322.5

(56) References Cited

U.S. PATENT DOCUMENTS

| | | |
|---|---|---|
| 2,138,175 A | 11/1938 | Keys |
| 2,216,814 A | 10/1940 | Gray, Jr. et al. |
| 3,134,585 A * | 5/1964 | Trask .......................... 267/153 |
| 3,920,231 A * | 11/1975 | Harrison et al. ............... 267/35 |
| 4,278,726 A | 7/1981 | Wieme |
| 4,627,635 A | 12/1986 | Koleda |
| 4,750,720 A | 6/1988 | Wolf et al. |
| 4,776,573 A | 10/1988 | Wolf et al. |
| 4,822,245 A | 4/1989 | Aubry et al. |
| 4,914,799 A | 4/1990 | Kyle |
| 4,964,516 A | 10/1990 | Thorn |
| 5,000,428 A | 3/1991 | Thorn |
| 5,054,753 A | 10/1991 | Polus |
| 5,088,702 A | 2/1992 | Thelamon et al. |
| 5,232,073 A | 8/1993 | Bronowicki et al. |
| 5,373,920 A | 12/1994 | Valdivia et al. |
| 5,435,531 A | 7/1995 | Smith et al. |
| 5,687,948 A | 11/1997 | Whiteford et al. |
| 6,092,795 A | 7/2000 | McGuire |
| 6,158,772 A | 12/2000 | Skudutis |
| 6,250,441 B1 * | 6/2001 | Shimoda ................... 188/322.5 |
| 6,394,432 B1 * | 5/2002 | Whiteford .............. 267/140.13 |

* cited by examiner

Primary Examiner—Jack Lavinder
Assistant Examiner—Melanie Torres
(74) Attorney, Agent, or Firm—Carlson, Gaskey & Olds

(57) ABSTRACT

A damping structure for providing damping and vibration attenuation includes an intermediate steel sheet positioned between an upper steel sheet and a lower steel sheet. The structure is incorporated as a part of a suspension component. The intermediate sheet is perforated with a plurality of holes, and a plurality of elastic strips are positioned between each of the sheets when assembled. The edges of the sheets are welded, sealing viscous fluid within the structure. Alternatively, the structure can be secured by rivets. Compression on the damping structure moves the fluid through the holes, providing a damping effect.

29 Claims, 6 Drawing Sheets

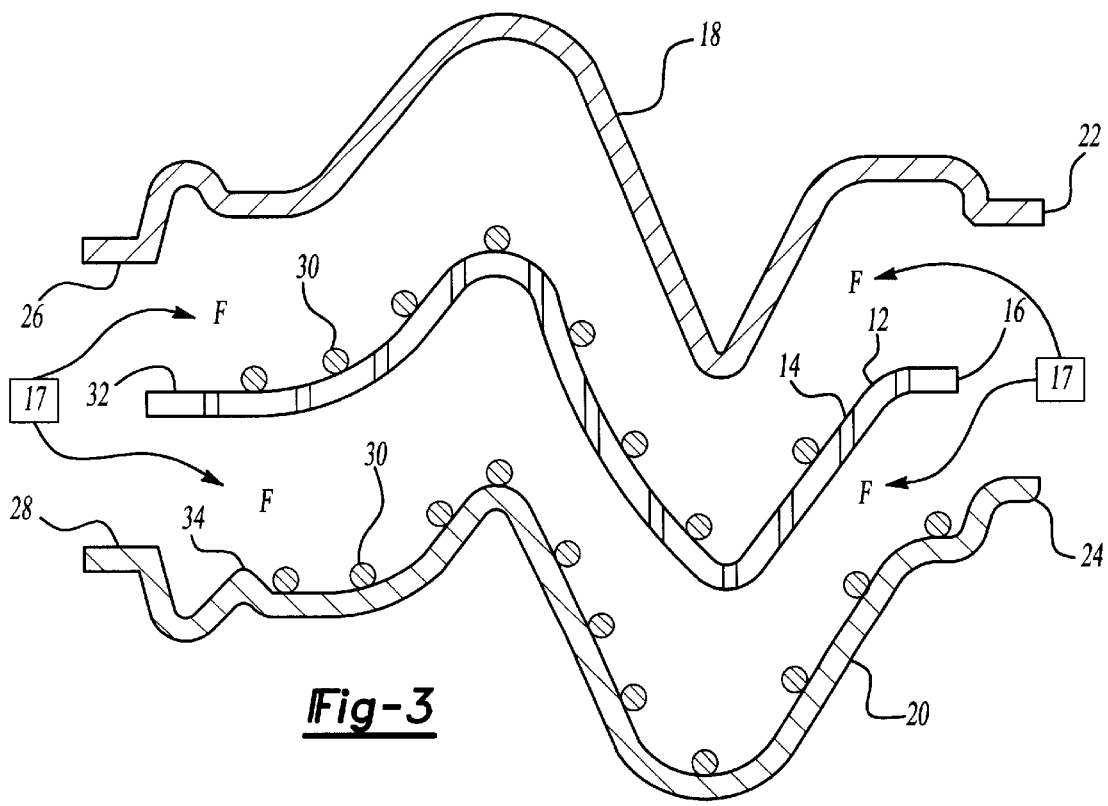
_Fig-3_
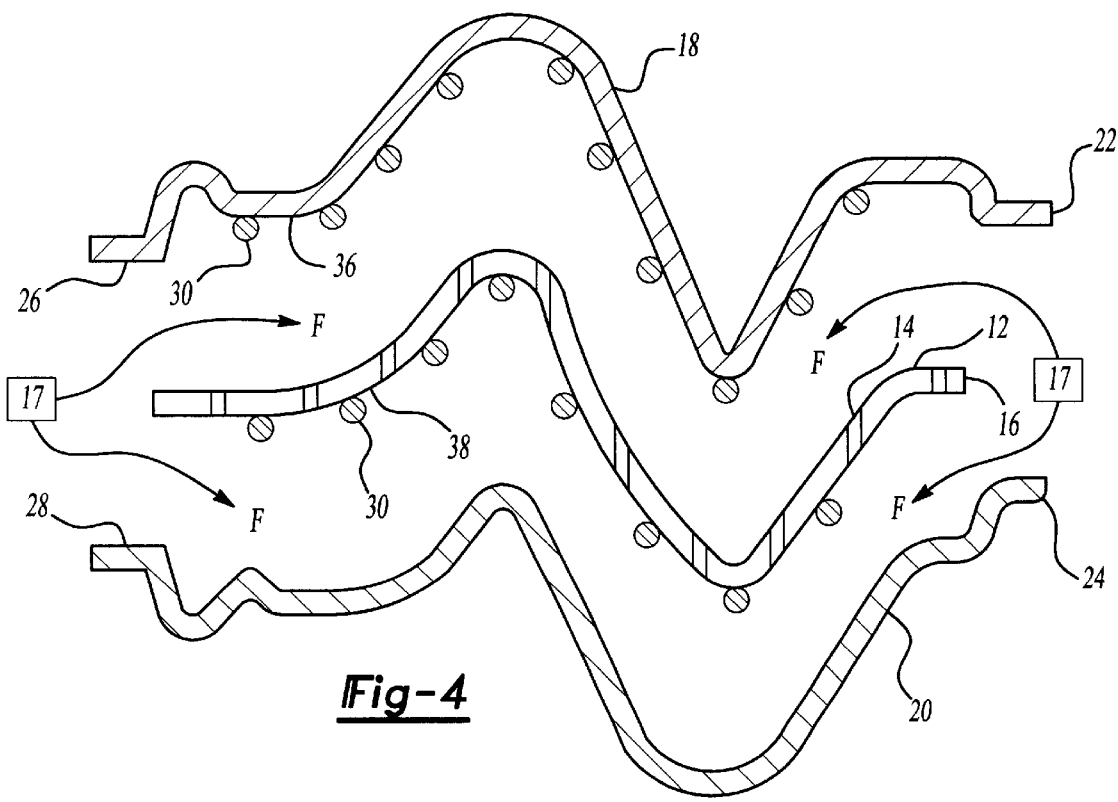
_Fig-4_

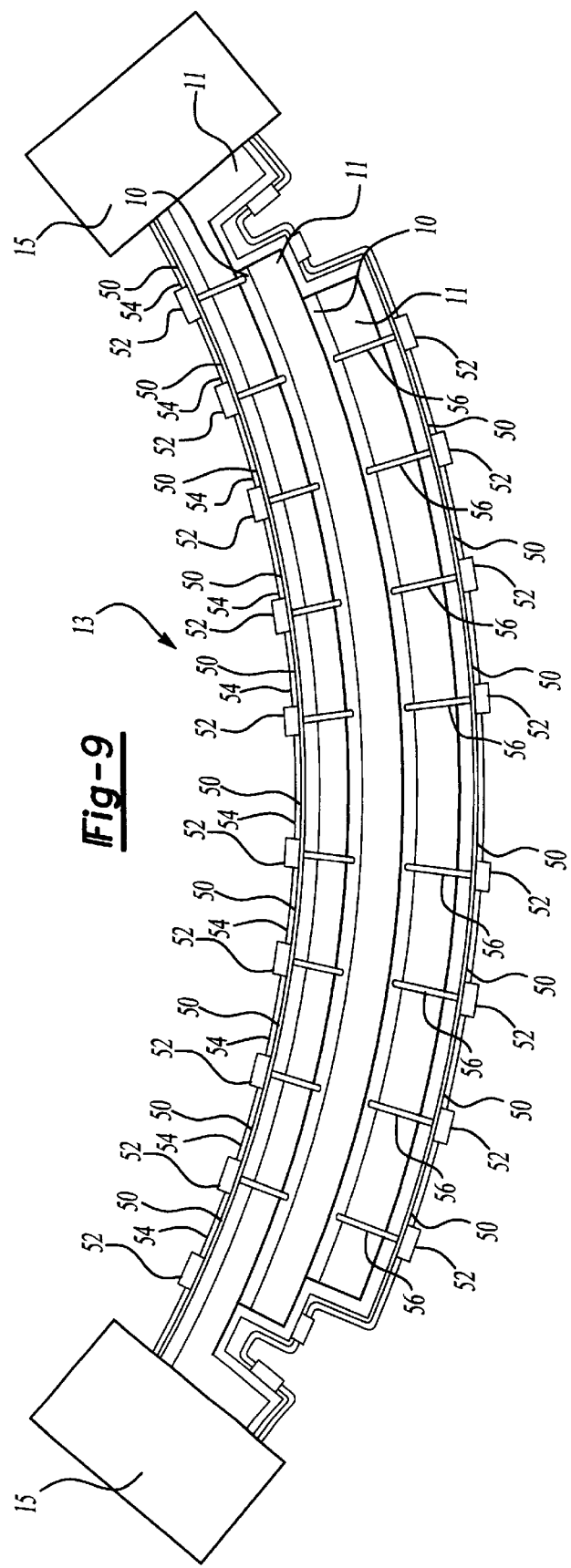

DAMPING STRUCTURE

BACKGROUND OF THE INVENTION

The present invention relates generally to a method for building a structure for vibration attenuation of structural elements in a vehicle.

A suspension system absorbs road shock and other vibrations, while providing for a smooth and comfortable ride. The suspension system responds to wheel disturbances and reacts to maintain wheel contact with the road surface. Damping systems produce opposing forces which counteract vibrations produced during vehicle operation. Damping forces provided by the suspension system cancel resonant responses which cause unwanted motion. In the prior art, fluid filled shock absorbers in the suspension system are used to counteract these vibrations. As fluid is commonly utilized to provide damping, the damping force increases approximately proportionally with the viscosity of the damping fluid. A drawback to prior damping systems is that these shock absorbers are passive in nature.

Hence, there is a need in the art for an improved structure for vibration attenuation of structural elements in a vehicle.

SUMMARY OF THE INVENTION

This invention relates to a method for building a structure for vibration attenuation of structural elements in a vehicle.

The structure includes an upper sheet, a lower sheet and an intermediate sheet perforated with a plurality of holes. The sheets, preferably made of steel, are stamped to a desired shape. A plurality of elastic strips are positioned such that a layer of elastic strips are located between each the sheets when assembled. The sheets are assembled so that the intermediate sheet is positioned substantially between the upper sheet and the lower sheet, and viscous fluid is dispersed between each layer. The sheets are secured, preferably by welding, sealing the viscous fluid within the structure. Movement of the fluid through the holes provides vibration attenuation and damping when the structure is compressed, extended, bent or submitted to vibrations.

In a second embodiment, a continuous elastic sealing strip is positioned between and substantially inside the edges of the upper and lower sheets, but outside the edge of the intermediate sheet, the sealing strip containing the fluid. The structure is preferably secured, such as by a plurality of rivets positioned between the edge of the inner and outer sheet and the sealing strip.

In a third embodiment, electro-rheological or magnetic-rheological fluid is utilized. Piezo-elements positioned in the suspension system provide an electrical input to the fluid in the structure to change the state of the fluid and alter the relative stiffness of the structure in response to a proportional increase in load.

Accordingly, the present invention provides a method for building a structure for vibration attenuation of structural elements in a vehicle.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 3 illustrates a side view of the intermediate sheet, upper sheet, and lower sheet of the present invention including a plurality of elastic strips on the upper surfaces of the sheets;

FIG. 4 illustrates a side view of the intermediate sheet, upper sheet, and lower sheet of the present invention including a plurality of elastic strips on the lower surfaces of the sheets;

FIG. 9 illustrates the present invention utilizing piezo-elements; and

DETAILED DESCRIPTION OF THE PREFERRED EMBODIMENT

Figure 1:
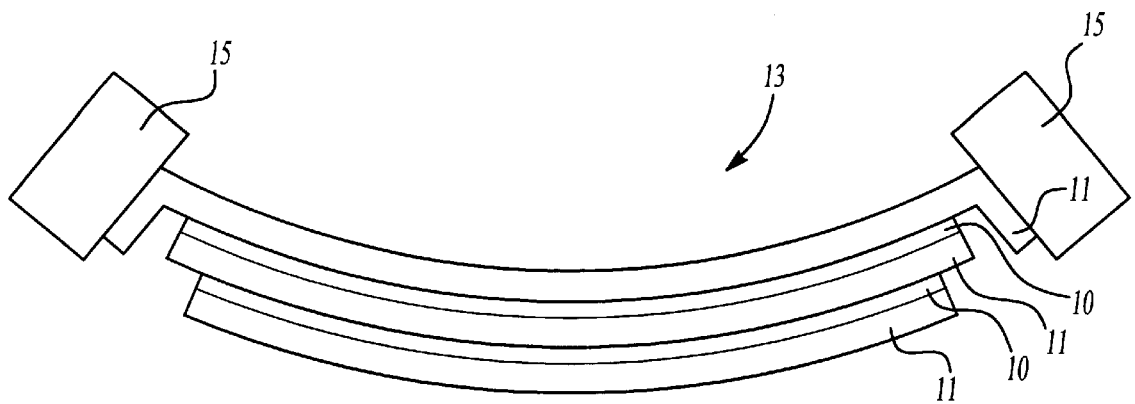
FIG. 1 illustrates a vehicle suspension system including leaf springs and the structure of the present invention.

FIG. 1 illustrates a vehicle suspension system 13. The structure 10 of the present invention is positioned between a suspension component, such as a leaf spring, providing damping forces and vibration attenuation between two vehicle frame members 15, shown schematically. The structure 10 may also be used in place of a standard sheet component, such as in a strut tower, in seats, and in a vehicle a sub-frame.

Figure 2:
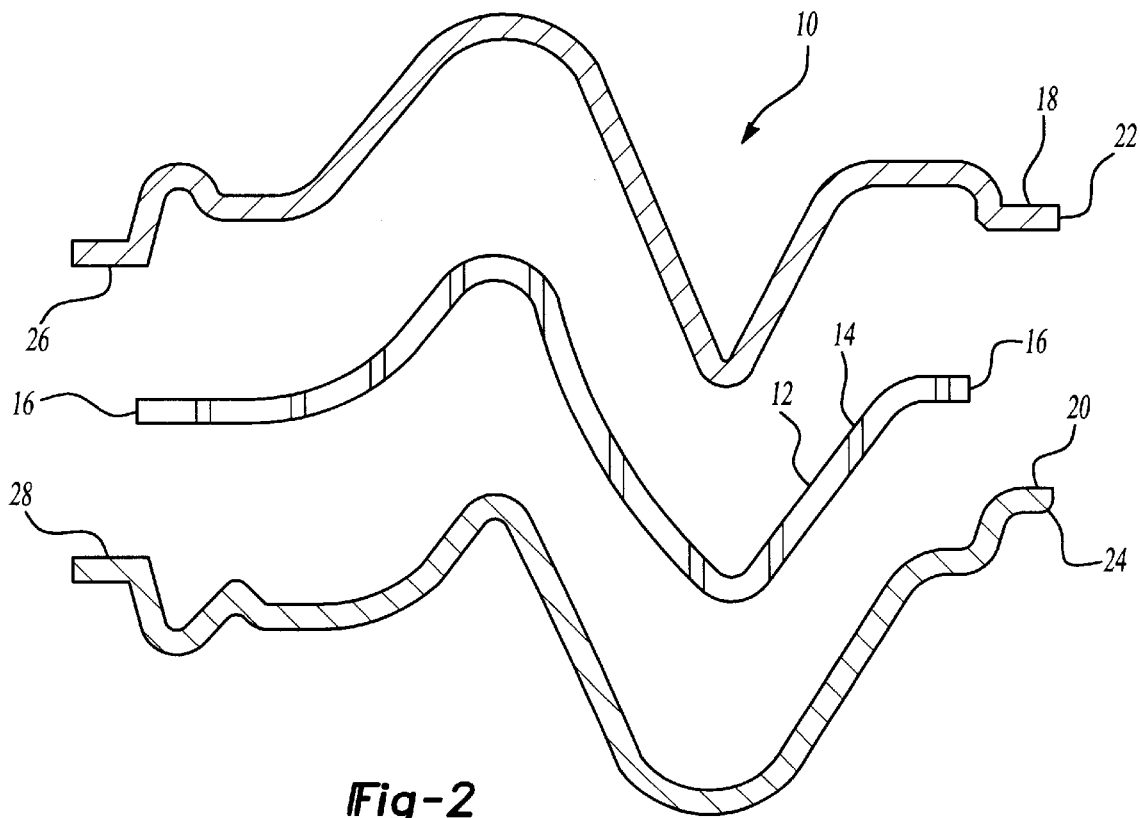
FIG. 2 illustrates a side view of the intermediate sheet, upper sheet, and lower sheet of the present invention stamped to a desired shape.

As illustrated in FIG. 2, the structure 10 is formed of an intermediate sheet 12, an upper sheet 18, and a lower sheet 20. It is preferred that the sheets 12, 18 and 20 be made of steel. The intermediate sheet 12 is perforated with a plurality of holes 14 at defined sites and of a defined distribution, and the sheet 12 is stamped to a desired shape. Excess material is removed from the intermediate sheet 12 to create an intermediate edge 16. Although the structure 10 can include any number of intermediate sheets 12, only one intermediate sheet 12 is described and illustrated.

The upper sheet 18 and lower sheet 20 are stamped to a desired shape, sheets 12, 18 and 20 being stamped in shape such the intermediate sheet 12 will substantially fit between the upper sheet 18 and lower sheet 20 when assembled to create the structure 10. Excess material is removed from the upper sheet 18 and lower sheet 20, creating an upper edge 22 and lower edge 24, respectively, which are finished to form an upper flange 26 and a lower flange 28, respectively.

As shown in FIG. 3, a plurality of elastic strips 30, preferably rubber, are bonded to the sheets 12, 18 and 20 after stamping so that a layer of elastic strips 30 are positioned between each of the sheets 12, 18 and 20 when assembled into the structure 10. The elastic strips 30 are positioned to substantially extend across the sheets 12, 18 and 20 to and from respective edges 16, 22 and 24. In the embodiment shown in FIG. 3, the plurality of elastic strips 30 are bonded to the upper surface 32 of the intermediate sheet 12 and the upper surface 34 of the lower sheet 20, the upper sheet 18 including no elastic strips 30. In another embodiment, shown in FIG. 4, the plurality of elastic strips 30 are bonded to the lower surface 36 of the upper sheet 18 and the lower surface 38 of the intermediate sheet 12, the lower sheet 20 including no elastic strips 30. The elastic strips 30 can also be bonded in other arrangements, such as only on the intermediate sheet 12 or alternatively only on the upper sheet 18 and lower sheet 20.

For certain stamping technologies, such as hydroforming, it is preferred to bond the elastic strips 30 to the sheets 12, 18 and 20 prior to stamping. Whether the elastic strips 30 are bonded to the sheets 12, 18 and 20 before or after stamping is determined by the shape of the sheets 12, 18 and 20, as well as the final distribution of the elastic strips 30.

As further shown in FIGS. 3 and 4, a viscous fluid F is dispersed on the upper surface 32 of the intermediate sheet 12 and the upper surface 34 of the lower sheet 20 by a fluid dispenser 17 during assembly.

When assembled, fluid F is dispersed on the upper surface 34 of the lower sheet 20, and the intermediate sheet 12 is positioned substantially over the lower sheet 20. Additional fluid F is then dispersed on the upper surface 32 of the intermediate sheet 12, the upper sheet 18 being positioned substantially over the intermediate sheet 12.

Figure 5:
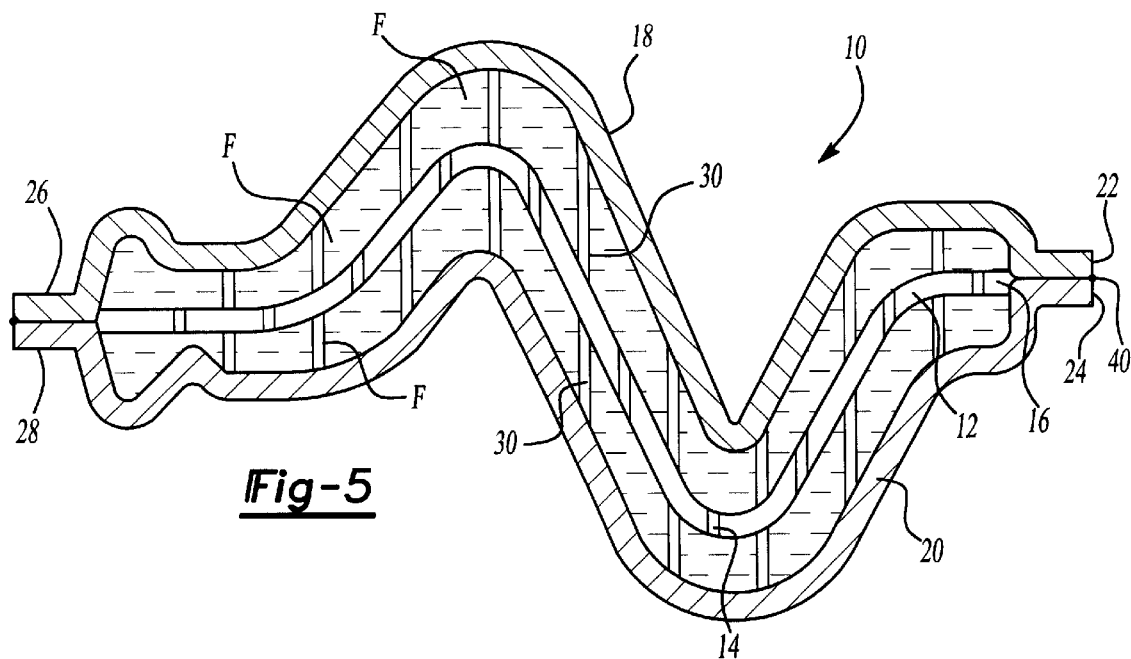
FIG. 5 illustrates a side view of the assembled structure of the present invention.

As illustrated in FIG. 5, when assembled, the upper flange 26 of the upper sheet 18 substantially contacts the lower flange 28 of the lower sheet 18. The contacting lower flange 28 and upper flange 26 are secured, sealing the viscous fluid F within the structure 10. It is preferred that the flanges 26 and 28 of the structure 10 be secured by welding, such as seam-welding. The welding 40 extends substantially around the entire upper edge 22 and lower edge 24 of the structure 10, the intermediate edge 16 of the intermediate sheet 12 being trapped within the structure 10. The assembled structure 10 provides vibration attenuation and damping when it is compressed, extended, bent or submitted to vibrations as the fluid F passes through the plurality of holes 14.

Figure 6:
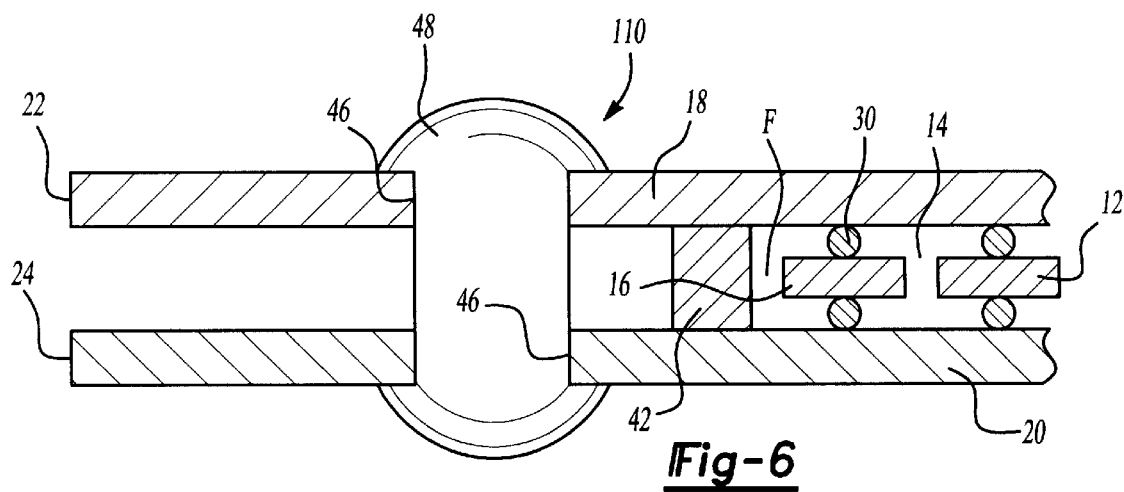
FIG. 6 illustrates a side view of a second embodiment of the present invention which utilizes rivets.

FIG. 6 illustrates an alternative embodiment of the present invention. In this embodiment, the intermediate sheet 12 is substantially smaller in dimension than the upper sheet 18 and the lower sheet 20. When the structure 10 is assembled, a continuous elastic sealing strip 42 is positioned substantially inside the edges 22 and 24 of the upper sheet 18 and lower sheet 10, respectively, but outside of the intermediate edge 16 of the intermediate sheet 12. The scaling strip 42 contains the fluid F in the Structure 110. The upper sheet 18 and lower sheet 20 are secured together by a plurality of attachment members 48 positioned substantially outside of the sealing strip 42. The sheets 18 and 20 each include a plurality of holes 46. When the structure 110 is assembled, the holes 46 in the upper sheet 18 substantially align with holes 46 in the lower sheet 20 to receive the attachment members 48, such as rivets. The attachment member 48 maintains compression force and presses on the scaling strip 42 to contain the fluid F within the structure 110.

Figure 7:
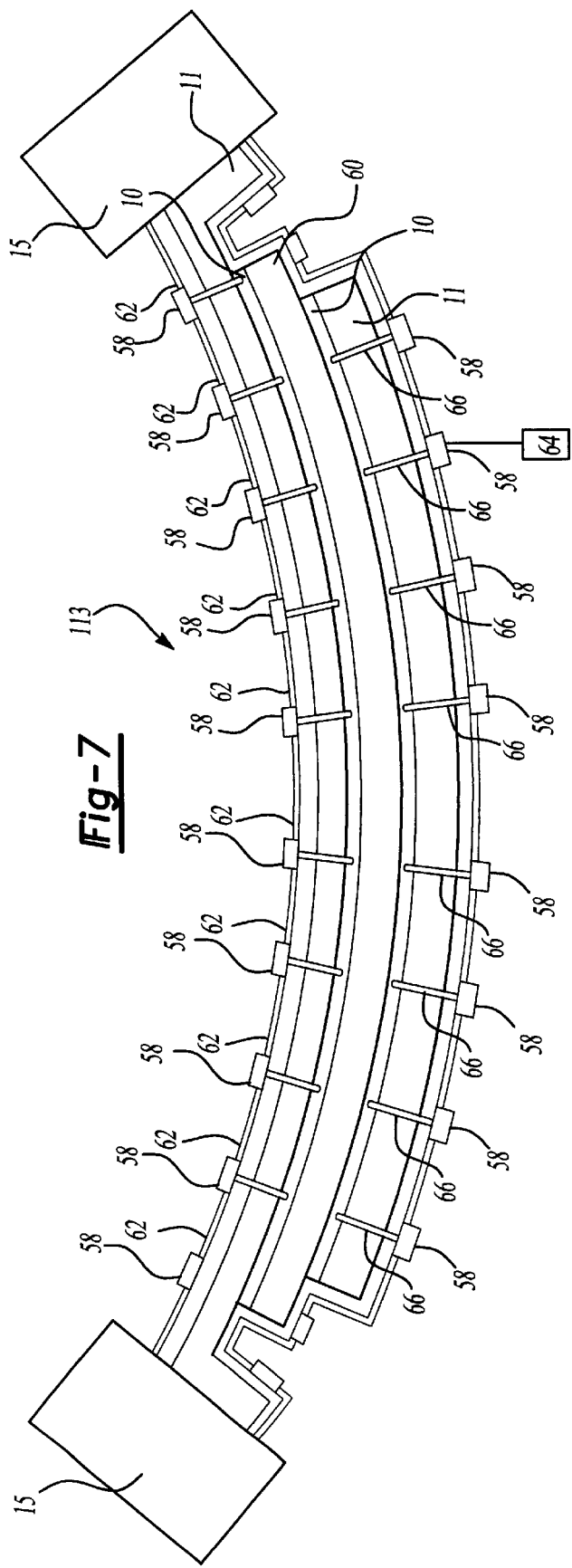
FIG. 7 illustrates the present invention utilizing electrical elements.
Figure 8:
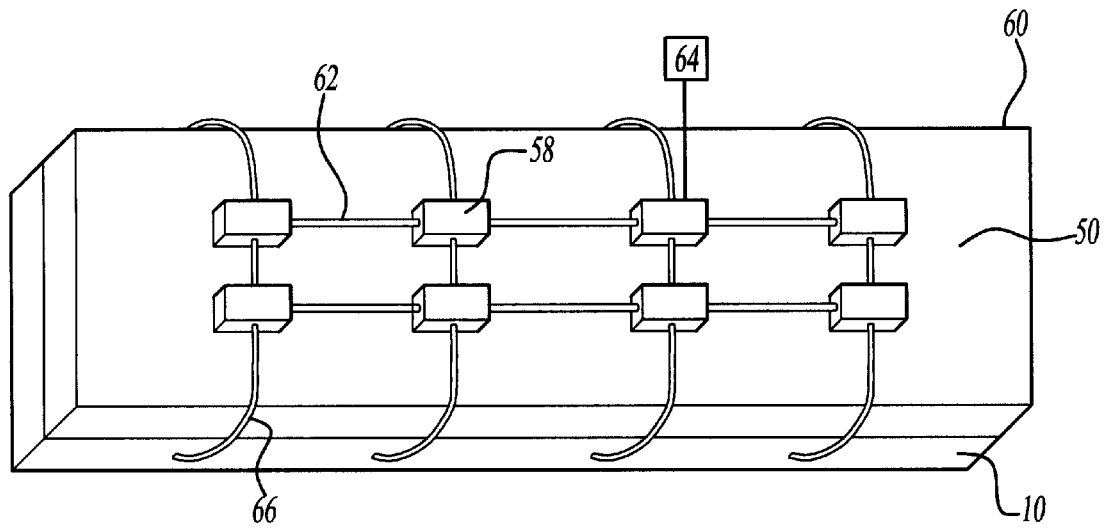
FIG. 8 illustrates a perspective view of the embodiment illustrated in FIG. 7.

Further damping can occur by using electro-rheological or magnetic-rheological fluid F, as illustrated in the vehicle suspension system 113 shown in FIG. 7. When in the liquid state, the electro-rheological or magnetic-rheological fluid F is flexible and soft. Electrical elements 58, such as capacitors or coils, are located on a load carrying member 60 and connected by a plurality of lead wires 62, shown in FIG. 8. A control voltage generated by a power source 64 is applied to the electrical elements 58 to generate an electric field or a magnetic field, supplying voltage to the structure 10 by a connecting wire 66. The power source 64 is either inside the system or outside the system, such as a battery. The control voltage increase the viscosity of the fluid F, increasing the relative stiffness of the structure 10.

Figure 10:
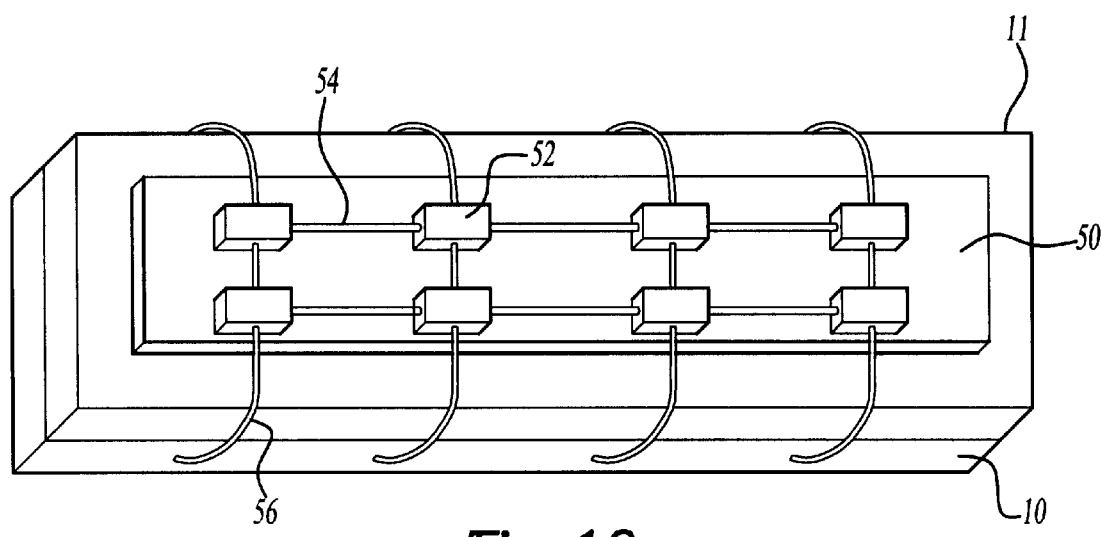
FIG. 10 illustrates a perspective view of the embodiment illustrated in FIG. 9.

Alternatively, as shown in FIG. 9, a vehicle suspension system 13 uses energy converters 52 to transfer the mechanical energy into electrical energy to control the viscosity of the electro-rheological or magnetic-rheological fluid F. When in the liquid state, the electro-rheological or magnetic-rheological fluid F is flexible and soft. The converters 52 can be a plurality of piezo-elements 52 mounted to a charge strip 50 on a suspension component 11, such as a leaf spring, to derive the electrical input which increases the viscosity of the fluid F and the stiffness of the structure 10. The piezo-elements 52 are connected by a plurality of lead wires 54. Preferably, the piezo-elements 52 be bonded or glued to the charge strip 50. An increase in load deflects and energizes the piezo-elements 52 to produce an electrical input, supplying voltage to the structure 10 by a connecting wire 54, as illustrated in FIG. 10. The electrical input increases the viscosity of the fluid F, increasing the relative stiffness of the structure 10 and producing damping by the opposing forces created in the structure 10. The voltage signal is related to the displacement of the suspension and the piezo-element 52 deflection and provides voltage at desired locations of the structure 10. The piezo-elements 52 can provide constant voltage to selected portions of the structure 10, allowing for control over the feet of the ride.

There are several advantages to utilizing the structure 10 of the present invention in a vehicle. For one, the structure 10 provides damping and vibration attenuation, reducing vibration and noise. Additionally, there is more freedom in designing components for a vehicle.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for forming a suspension structure comprising the steps of:

forming a damping structure by forming a plurality of holes in at least one intermediate sheet, positioning said at least one intermediate sheet substantially between an upper sheet having an upper edge and a lower sheet having a lower edge, positioning a plurality of elastic members substantially between each of said sheets, dispensing a fluid substantially between each of said sheets, and securing said upper sheet and said lower sheet substantially proximate to said upper edge and said lower edge with an attachment member to contain said fluid; and positioning said damping structure between two of a plurality of suspension components.

2. The method as recited in claim 1 further comprising the step of shaping said upper sheet, said lower sheet, and said at least one intermediate sheet to a desired shape, each of said sheets being substantially shaped such that said sheets substantially interfit when assembled.

3. The method as recited in claim 1 wherein the step of positioning said plurality of elastic members further comprises securing each of said plurality of elastic members to an upper surface of each of said at least one intermediate sheet and to an upper surface of said lower sheet.

4. The method as recited in claim 1 wherein the step of positioning said plurality of elastic members further comprises securing each of said plurality of elastic members to a lower surface of each of said at least one intermediate sheet and to a lower surface of said upper sheet.

5. The method as recited in claim 1 wherein said attachment member is a weld head, and the step of securing said upper sheet to said lower sheet further includes welding said upper edge of said upper sheet to said lower edge of said lower sheet.

6. The method as recited in claim 1 wherein the step of securing said upper sheet to said lower sheet further includes passing said attachment member through an upper hole in said upper sheet and an aligned lower hole in said lower sheet, said fluid being contained by a continuous elastic strip positioned substantially between said upper sheet and said lower sheet.

7. The method as recited in claim 6 wherein said attachment member is positioned substantially between said elastic strip and said aligned upper edge and said lower edge.

8. The method as recited in claim 6 wherein said attachment member is a rivet.

9. The method as recited in claim 1 further comprising the step of securing and electrically connecting a plurality of piezo-elements to least one of said plurality of suspension components, said piezo-elements being electrically connected to said structure, said fluid being reactive to an electrical input produced by said plurality of piezo-elements by a load applied to said spring.

10. The method as recited in claim 9 wherein said piezo-elements apply said electric input to said fluid to substantially alter a state of said fluid.

11. The method as recited in claim 9 wherein said fluid is electro-rheological.

12. The method as recited in claim 9 wherein said fluid is magnetic-rheological.

13. The method as recited in claim 1 further comprising the steps of securing a plurality of electrical elements to a load carrying member, said electrical elements being electrically connected to said structure, and applying a voltage to said electrical elements to produce an electrical input to substantially alter a state of said fluid.

14. The method as recited in claim 1 wherein a flow of said fluid through said plurality of holes provides a damping effect.

15. A vehicle suspension system comprising:
at least two of one damping structure positioned between two of said plurality of suspension components, each of said at least one damping structure including at least one intermediate sheet having a plurality of holes, said at least one intermediate sheet being positioned substantially between an upper sheet having an upper edge and a lower sheet having a lower edge, each of said at least one damping structure further including a plurality of elastic members positioned substantially between each of said sheets, said upper sheet and said lower sheet being secured substantially proximate to said upper edge and said lower edge with an attachment member to contain a fluid within each of said at least one damping structure.

16. The vehicle suspension system as recited in claim 15 wherein there are a plurality of said at least one damping structure, each of said plurality of said at least one damping structure being positioned substantially between two of said plurality of suspension components.

17. The vehicle suspension system as recited in claim 15 wherein said plurality of suspension components are a spring.

18. The vehicle suspension system as recited in claim 15 wherein said upper sheet, said lower sheet, and said at least one intermediate sheet are made of steel.

19. The method as recited in claim 15 wherein there are one of said at least one intermediate sheet.

20. The method as recited in claim 15 wherein said at least one elastic member is made of rubber.

21. The vehicle suspension system as recited in claim 15 wherein said plurality of elastic members are positioned on an upper surface of each of said at least one intermediate sheet and to an upper surface of said lower sheet.

22. The vehicle suspension system as recited in claim 15 wherein said plurality of elastic members are positioned on a lower surface of each of said at least one intermediate sheet and to a lower surface of said upper sheet.

23. The vehicle suspension system as recited in claim 15 wherein said attachment member is a weld head.

24. The vehicle suspension system as recited in claim 15 wherein said attachment member is a rivet.

25. The vehicle suspension system as recited in claim 15 wherein said vehicle suspension system further includes a plurality of piezo-elements electrically connected to at least one of said plurality of suspension components, said plurality of piezo-elements providing an electrical input to said at least one damping structure under a load applied to said vehicle suspension system.

26. The vehicle suspension system as recited in claim 25 wherein said electrical input substantially change a state of said fluid.

27. The vehicle suspension system as recited in claim 25 wherein said fluid is electro-rheological.

28. The vehicle suspension system as recited in claim 25 wherein said fluid is magnetic-rheological.

29. The vehicle suspension system as recited in claim 15 wherein said vehicle suspension system further includes a load carrying member including a plurality of electrical elements, said plurality of electrical elements being electrically connected to said structure to provide an electrical input to said structure when a voltage is applied to said electrical elements to produce said electrical input to substantially changes a state of said fluid.

* * * * *

UNITED STATES PATENT AND TRADEMARK OFFICE
CERTIFICATE OF CORRECTION

PATENT NO. : 6,641,121 B1
DATED : November 4, 2003
INVENTOR(S) : Carlstedt et al.

It is certified that error appears in the above-identified patent and that said Letters Patent is hereby corrected as shown below:

Column 5,
Line 12, "head" should be -- bead --
Line 52, please insert -- a plurality of suspension components; and -- before "at least two of one damping structure positioned between…"
Line 52, please delete "two of" between "at least" and "one"

Column 6,
Line 32, "head" should be -- bead --

Signed and Sealed this

Sixteenth Day of March, 2004

JON W. DUDAS
*Acting Director of the United States Patent and Trademark Office*